INVENTORS
BOYD CORNELISON AND
BY ELMER A. WOLFF, JR.

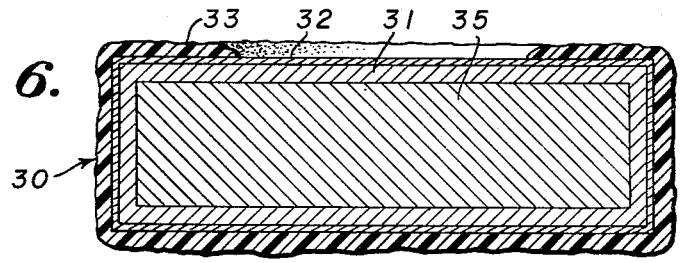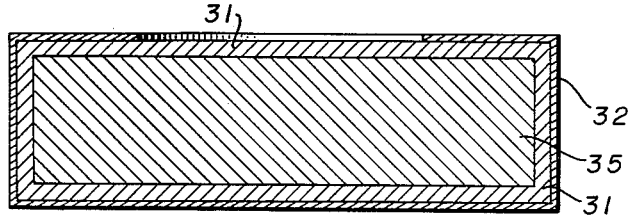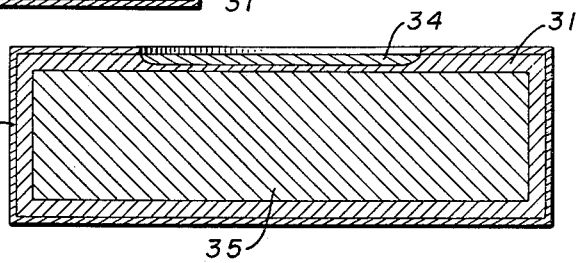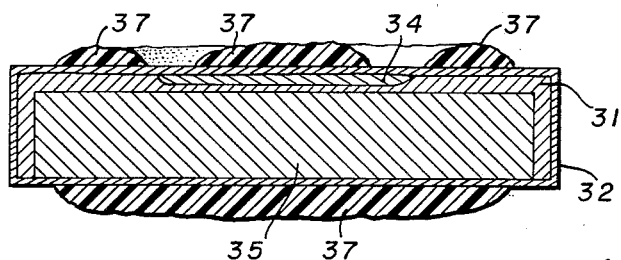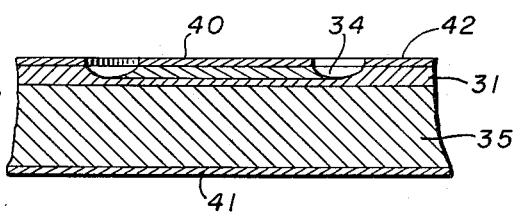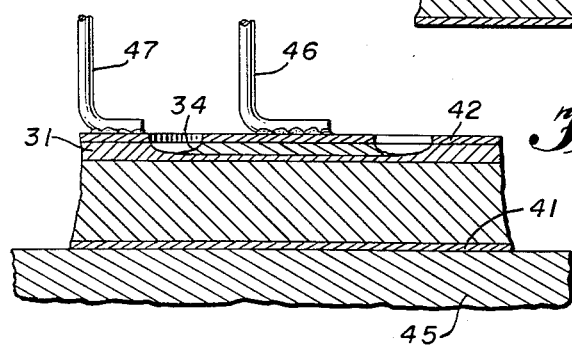

INVENTORS
BOYD CORNELISON AND
BY ELMER A. WOLFF, JR.

ATTORNEYS

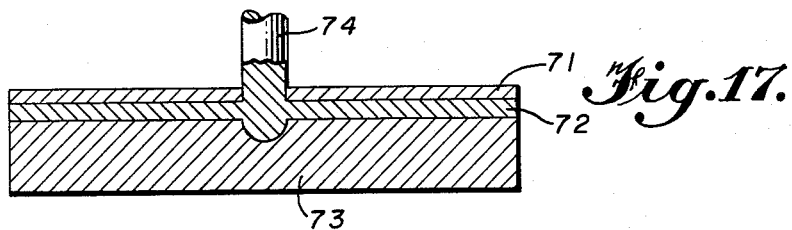
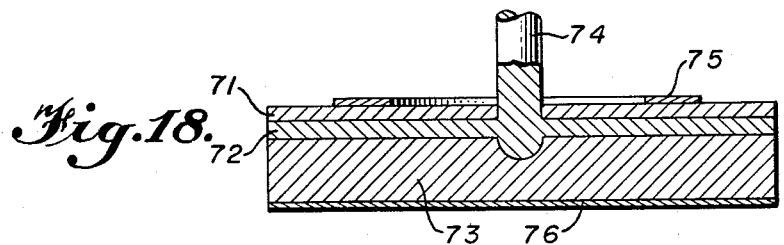
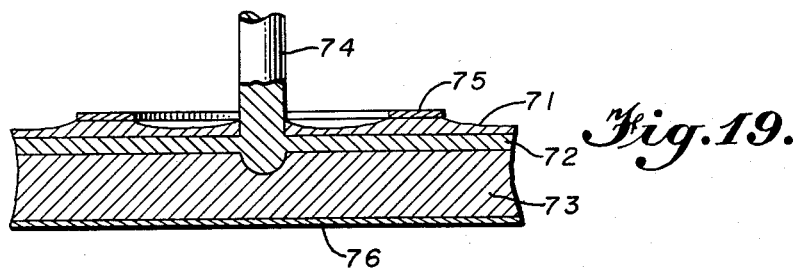
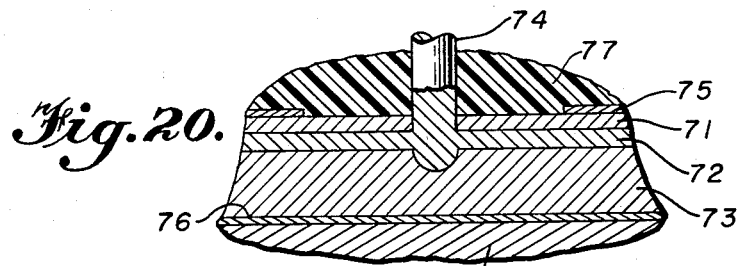
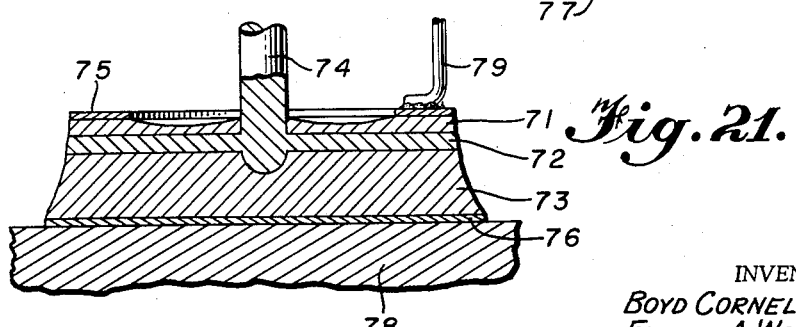

United States Patent Office 2,952,896
Patented Sept. 20, 1960

2,952,896

FABRICATION TECHNIQUES FOR TRANSISTORS

Boyd Cornelison, Dallas, and Elmer A. Wolff, Jr., Richardson, Tex., assignors to Texas Instruments Incorporated, Dallas, Tex., a corporation of Delaware Filed Apr. 11, 1958, Ser. No. 727,871

1 Claim. (Cl. 29—25.3)

The present invention relates to novel fabrication techniques for the production of transistors made by diffusion techniques.

Recent efforts are being advanced having as an objective the production of transistors made by diffusion techniques for operation at elevated temperatures. Although much work has been done along the general lines set forth above and devices have been produced by hand there still remains to be developed techniques for producing transistors using diffusion techniques in commercial quantities. The various methods advanced to date for fabricating transistors using diffusion techniques are unproven and have not extended sufficiently beyond the experimental stage to be adapted to high quantity production and hence such devices are still not available commercially in quantity with desirable operating characteristics.

It is proposed by the present invention to provide fabrication techniques which lend themselves to the production of transistors using diffusion techniques in substantial quantities and places the production of these devices on a commercial scale. Although the invention includes the fabrication of transistors from any semiconductor material and includes producing both n-p-n and p-n-p types. The method of the invention is useful to produce transistors for any purpose. To demonstrate the novelty, however, the invention will be described by way of example with reference to the production of a high-power diffused silicon transistor.

By present standards the term high-power as applied to transistors refers to devices having a power rating of at least 5 watts. To date it has not been possible to obtain, on a commercial scale, devices having a power rating above 15 watts. As a result of the remarkable advances offered by the present invention and the novel innovations in fabricating techniques herein presented, it has been possible to produce, on a commercially reproducible basis, high-power transistors as well as transistors for other purposes.

This has been achieved by the judicious selection of old and new steps into novel combinations resulting in superior fabrication techniques. The diffused junction silicon transistors produced according to the present invention are characterized by a large collector-base junction area and a highly efficient base-emitter junction and can be made to meet the following specifications. The collector back-down voltage, $BV_{cbo}$, is 80 volts at a minimum; the collector current, $I_c$, is 10 amperes at a minimum; the forward transfer current ratio, $h_{FE}$, ($I_c = 5$ amperes, $V_c = 10$ volts) is 10; the collector saturation resistance, $R_{cs}$, ($I_c = 5$ amperes, $I_b = 1$ ampere) is 2 ohms at a minimum; the collector cutoff current, $I_{co}$, ($V_c = 30$ volts, $I_e = 0$, $T_A = 100°$ C.) is 10 milliamps at a maximum; dissipation (Case temperature, 25° C.) is 50 watts at a minimum; (Case temperature, 100° C.) is 20 watts at a minimum; and storage temperature is 200° C. at a minimum.

The above is accomplished by solving in a commercially reproducible way the problems of device configuration, contact design, contact attachment, lead attachment, and other problems heretofore limiting the quantity production of high-power devices.

The novel fabrication techniques herein disclosed provide a means whereby high-power diffused silicon transistors can be produced which meet the specifications set forth in the preceding paragraph. In addition, the techniques are such that they can be readily and easily duplicated whereby the devices can be produced in substantial quantities.

Accordingly, it is an object of the present invention to provide novel fabrication techniques for the production of transistors using diffusion techniques, for example, high-power diffused silicon transistors, which will enable the production of such devices on a commercial scale to desirable specifications.

It is a further object of the present invention to provide novel fabrication techniques for producing devices as described above which will be capable of being carried out efficiently and expeditiously.

Other objects and advantages of the present invention will become more readily apparent from the following detailed description of the novel fabrication techniques of the present invention when taken in conjunction with the appended drawings, in which:

Fig. 6 illustrates in section a masked semiconductor wafer from which a high-power diffused silicon transistor is produced according to a second technique of the present invention;

Fig. 7 is a view similar to Fig. 6 showing a further step of the second technique;

Fig. 8 is a view similar to Figs. 6 and 7 illustrating a further step of the second technique;

Fig. 9 is a view similar to Figs. 6–8 illustrating a further step of the second technique;

Fig. 10 is a view similar to Figs. 6–9 illustrating a further step of the second technique;

Fig. 11 is a view in section through the device produced by means of the second technique;

Fig. 17 is a view in section through a semiconductor wafer with base lead attached from which a high-power diffused silicon transistor is produced according to a fourth technique of the present invention;

Fig. 18 is a view similar to Fig. 17 illustrating a further step of the technique;

Fig. 19 is a view similar to Figs. 17 and 18 illustrating a further step of the technique;

Fig. 20 is a view similar to Figs. 17–19 illustrating a further step of the technique; and Fig. 21 is a view in section through the completed device produced according to the fourth technique.

Figure 1:
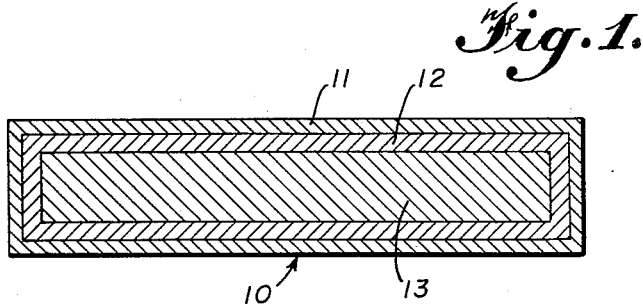
Fig. 1 illustrates a diffused n-p-n- structure from which a high-power diffused silicon transistor is produced according to a first novel fabrication technique of the present invention.

Referring now to the drawings, Figs. 1–5 illustrate a novel fabrication technique by way of example with reference to the production of high-power diffused silicon transistors. The technique illustrated in Figs. 1-5 begins with a wafer of semiconductor material containing an active impurity of an n conductivity producing type. Any of the known suitable n-type impurity materials may be incorporated into the semiconductor material which, in the example, is silicon. It should be noted that for purposes of simplifying the descriptions of the preferred embodiments of the present invention, the several fabrication techniques will be illustrated with reference to the production of n-p-n devices. According to the first step of the fabrication technique both donor and acceptor impurities are simultaneously diffused from the vapor state into all surfaces of the silicon wafer 10. Briefly the process is as follows. Wafers of silicon as illustrated in Fig. 1 of suitable size, resistivity and surface condition are enclosed in a quartz tube together with suitable quantities in the current ratio of both donor and acceptor impurities. This tube is then evacuated to a pressure of less than 1 mm. mercury and closed by flame sealing. The tube containing the wafers and the impurities is then inserted in a furnace and baked at a temperature of approximately 1200° C. for 8 hours, allowing simultaneous diffusion of the acceptor and donor impurities into the silicon according to schedules predicted from theoretical analysis. After the desired time has elapsed, the tube is cooled exponentially according to a predetermined program in accordance with known practices. When cooled sufficiently, the tubes are removed and opened. The wafers are then ready for processing into triode structures.

The donor and acceptor impurities used in the diffusion process are selected with the acceptor impurity having a greater diffusion coefficient than the donor impurity but producing on the surface of the wafer a greater concentration of the donor impurity. The resulting wafer 10 has a surface layer 11 about 0.3 mil deep exhibiting n-type conductivity and a layer 12 of p-type conductivity immediately adjacent to it. The central region 13 of the wafer 10 retains its original n-type conductivity. Layer 11 is the emitter region, layer 12 the base region and the collector is region 13.

Figure 2:
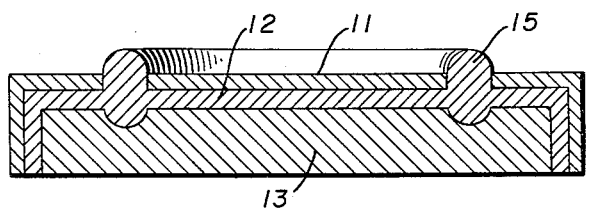
Fig. 2 is a view similar to Fig. 1 illustrating a further step of the technique.

The wafer 10 is processed by lapping off one side to expose the collector region 13. An aluminum base ring 15 is alloyed through the diffused emitter layer 11 into the diffused base layer 12 as shown in Fig. 2. This is accomplished by loading a plurality of wafers into a boat together with an aluminum ring base contact properly arranged on each. The alloying to the base region is carried out in a controlled atmosphere conveyor furnace at a suitable temperature and the operation requires about 30 minutes.

Figure 3:
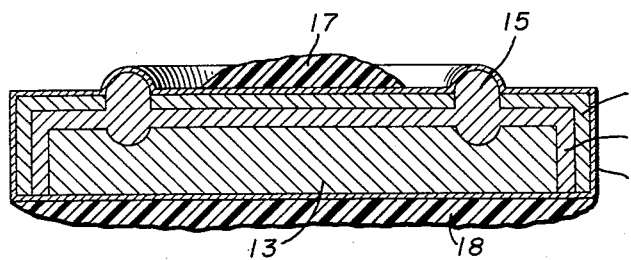
Fig. 3 is a view similar to Figs. 1 and 2 illustrating a further step of the technique.
Figure 4:
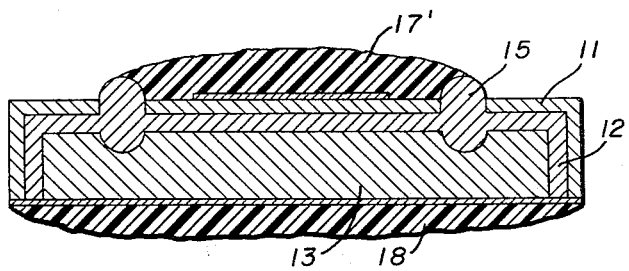
Fig. 4 is a view similar to Figs. 1–3 illustrating a further step of the technique.
Figure 5:
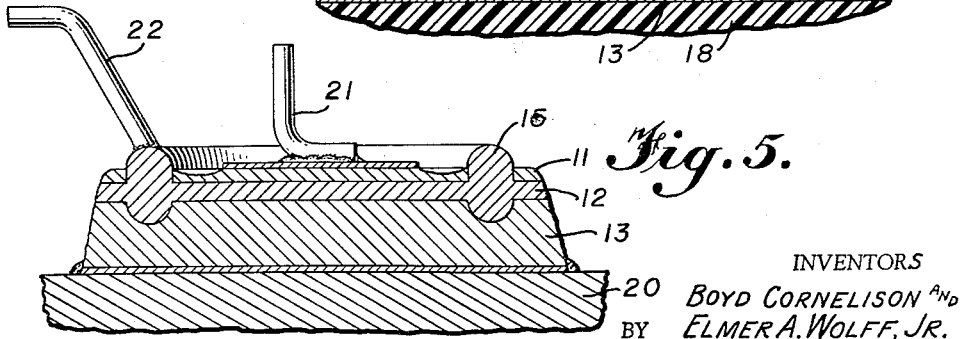
Fig. 5 is a view similar to Figs. 1–4 illustrating the device produced by the technique.
Figure 12:
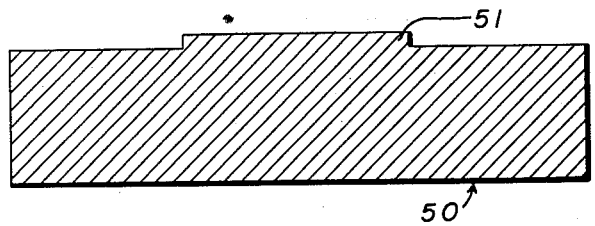
Fig. 12 is a view in section of a shaped semiconductor wafer from which a high-power diffused silicon transistor is produced according to a third technique of the present invention.
Figure 13:
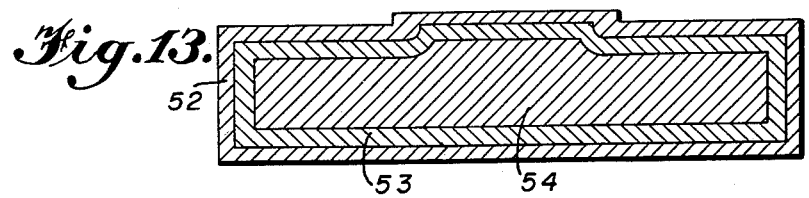
Fig. 13 is a view similar to Fig. 12 illustrating a further step of the third technique.
Figure 14:
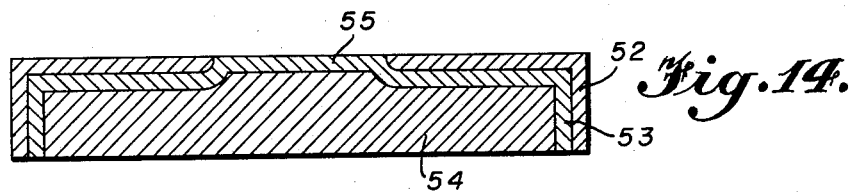
Fig. 14 is a view similar to Figs. 12 and 13 illustrating a further step of the third technique.
Figure 15:
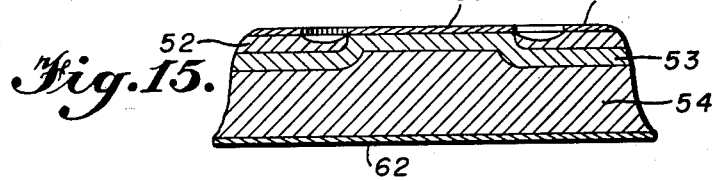
Fig. 15 is a view similar to Figs. 12–14 illustrating a further step of the third technique.
Figure 16:
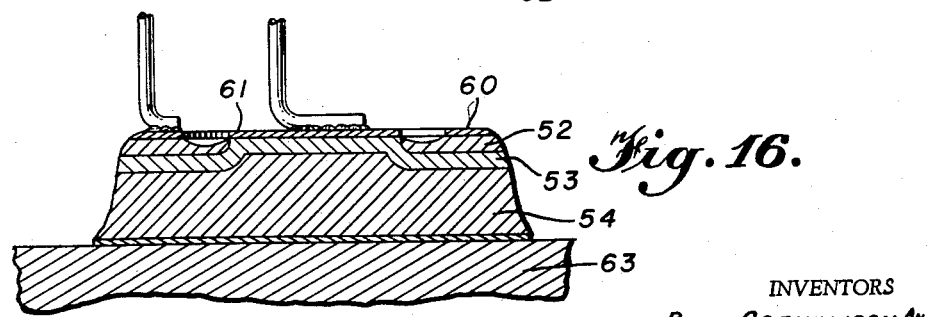
Fig. 16 is a view in section through the completed device produced according to the third technique.

The next steps of the process are illustrated in Fig. 3. The entire assembly is nickel plated to form a coating 16 on all exposed surfaces in a conventional way. Thereafter, a suitable masking material 17 such as a dyed plastic resin is deposited on the surface of the device within the aluminum base ring 15. Additional masking material 18 is coated on the nickel plating covering the collector region 13 of the device. The assembly is then subjected to a leaching treatment to remove nickel from the unmasked portions. Any well known leaching agent may be employed for this purpose, for example, nitric acid. Next, masking material is added to cover the entire area of the emitter and base ring and the edge portions of the wafer are etched away. Thereafter, the masking material is removed by a suitable solvent and the device is subjected to a cleaning etch using a standard etching solution. The device is now completed and is mounted onto a header 20 preferably of copper by soldering the nickel plating collector 13 to the upper surface of the header 20. Emitter and base leads 21 and 22, respectively, are then attached to produce the finished triode structure.

The second novel fabrication technique of the present invention for producing high-power diffused silicon transistors of the general desired configuration is illustrated in Figs. 6–11. The technique originates with a wafer designated generally as 30 of silicon containing an active impurity to impart n-type conductivity. A p-type impurity is diffused from the vapor state into the surfaces of the silicon wafer producing a layer 31 of p-type conductivity. The wafer is then provided with a heavy oxided layer 32 on all exposed surfaces by a conventional oxidizing technique. The oxided wafer is then masked by a suitable masking material 33 except for the proposed emitter area. The oxide is etched away from the proposed emitter area by use of any suitable etchant, for example CP-4, a standard etch for use in transistor technology and consists essentially of nitric acid, hydrofluoric acid, acetic acid and bromine combined in suitable proportions well known in the art. The mask 33 is then removed from the wafer 30 by a suitable solvent. The purpose of mask 33 is only to shape the oxide layer 32 which is a diffusion retardant layer capable of withstanding the temperatures of diffusion without being impaired.

Thereafter, the wafer is subjected to a second diffusion step, this time an active impurity capable of producing n-type conductivity is diffused from the vapor state into the wafer 30. Due to the oxide layer 32, diffusion will occur only in the oxide-free emitter area and will form an n-type conductivity region 34 by converting a portion of the p-layer 31 to n-type conductivity. The wafer is then lapped to expose collector region 35 and the wafer is coated with nickel 36 by a standard technique. Plastic resin masking material 37 is provided to mask selected areas of nickel plating 36 to mask out an emitter contact, a collector contact and a base ring contact. The unmasked areas, as shown in Fig. 9, are subjected to an etching treatment using any suitable etch attacking nickel and silicon to remove the unmasked nickel areas, as well as the unmasked silicon areas. The masking material 37 is then removed and there now remains nickel plated areas constituting emitter contact 40, collector contact 41 and base ring contact 42. The device is then mounted onto a copper header 45 by soldering the nickel collector contact 42 to the top surface of the copper header. Leads 46 and 47 are attached to the central emitter contact 40 and surrounding base ring contact 42, respectively.

A third fabrication technique is illustrated in Figs. 12–16 and originates with a wafer 50 of silicon containing an active impurity which imparts n-type conductivity. The first step of the fabrication technique involves shaping of the wafer by removing portions of one surface in any convenient way to leave remaining a circular plateau or mesa 51. The wafer, after shaping, is thereafter subjected to a diffusion process. Both donor and acceptor impurities are simultaneously vapor diffused into all surfaces of the silicon wafer in accordance with the description with respect to the first fabrication technique. There results the configuration shown in Fig. 13 consisting of a surface layer 52 of n-type conductivity, a layer 53 of p-type conductivity and a central region 54 of the original n-type conductivity.

Thereafter, the face of the diffused wafer opposite the mesa 51 is lapped off to expose the region 54, which will constitute the collector, and the face of the wafer containing the mesa 51 is lapped off to leave exposed an area 55 of p-type layer 53 which constitutes the base region of the device. The n-type conductivity layer 52 constitutes the emitter of the device. The device is nickel plated on all surfaces and then masked to block out a base contact, an emitter ring contact and a collector contact in the manner previously described. The masked wafer is etched to remove unmasked areas and when the masking is removed, there results the configuration shown in Fig. 15. This configuration including emitter ring contact 60, base contact 61 and collector contact 62 is mounted onto a copper header 63 by soldering the collector contact 62 to the surface of header 63. Leads 64 and 65 are attached to the emitter ring contact 60 and base contact 61, respectively.

A fourth fabrication technique is illustrated in Figs. 17 to 21. The technique originates with a silicon wafer of n-type conductivity which has diffused into its surfaces both donor and acceptor impurities. The wafer is then lapped and etched as previously described to remove unwanted areas and to produce a configuration as illustrated in Fig. 17, consisting essentially of a surface emitter layer 71 of n-type conductivity, a layer 72 of p-type conductivity and a collector layer 73 of n-type conductivity. A p-type conductivity producing base lead 74 which may be an aluminum wire is alloyed through the diffused emitter layer 71 into contact with the base layer 72. The device is then plated all over with nickel in accordance with known techniques and thereafter masking material is applied to the nickel coating to block out an emitter ring contact 75 and a collector contact 76. The unmasked nickel regions are leached away by means of a suitable solvent, as for example, an acid etch. The device is then subjected to a cleaning etch using a mask 77 to protect the various contacts. The masking material is thereafter moved and the device is mounted on a copper header 78 by soldering the collector contact 76 to the top surface of the header 78. A lead 79 is soldered to the emitter contact 75.

Although the present invention has been shown and described with reference to preferred embodiments nevertheless it will be appreciated that changes and modifications may appear to those skilled in the art from a knowledge of this disclosure which changes or modifications do not in fact depart from the spirit and scope of the inventive subject matter herein revealed. Such changes and modifications are accordingly deemed to be within the spirit and contemplation of the invention.

What is claimed is:

A process for making a transistor comprising diffusing donor and acceptor impurities into a wafer of semiconductor material containing an active impurity to establish two peripheral layers separated from the main portion of said wafer and from each other by p-n junctions, removing the diffused layers from one surface of the wafer, alloying a ring through the remaining diffused layers in the wafer to form an ohmic contact with the inner layer, plating the wafer with a conductive coating, masking said surface from which the diffused layers were removed and a region on the other surface of the wafer within the ring, removing unmasked areas of said coating, masking said ring and the area within said ring, removing unmasked portions of the wafer, and making electrical attachment to the remaining plated areas and said ring.

No references cited.